May 3, 1960
W. D. CARRIE
VALVE PRESSURE TESTING APPARATUS
Filed May 24, 1956
2,934,943
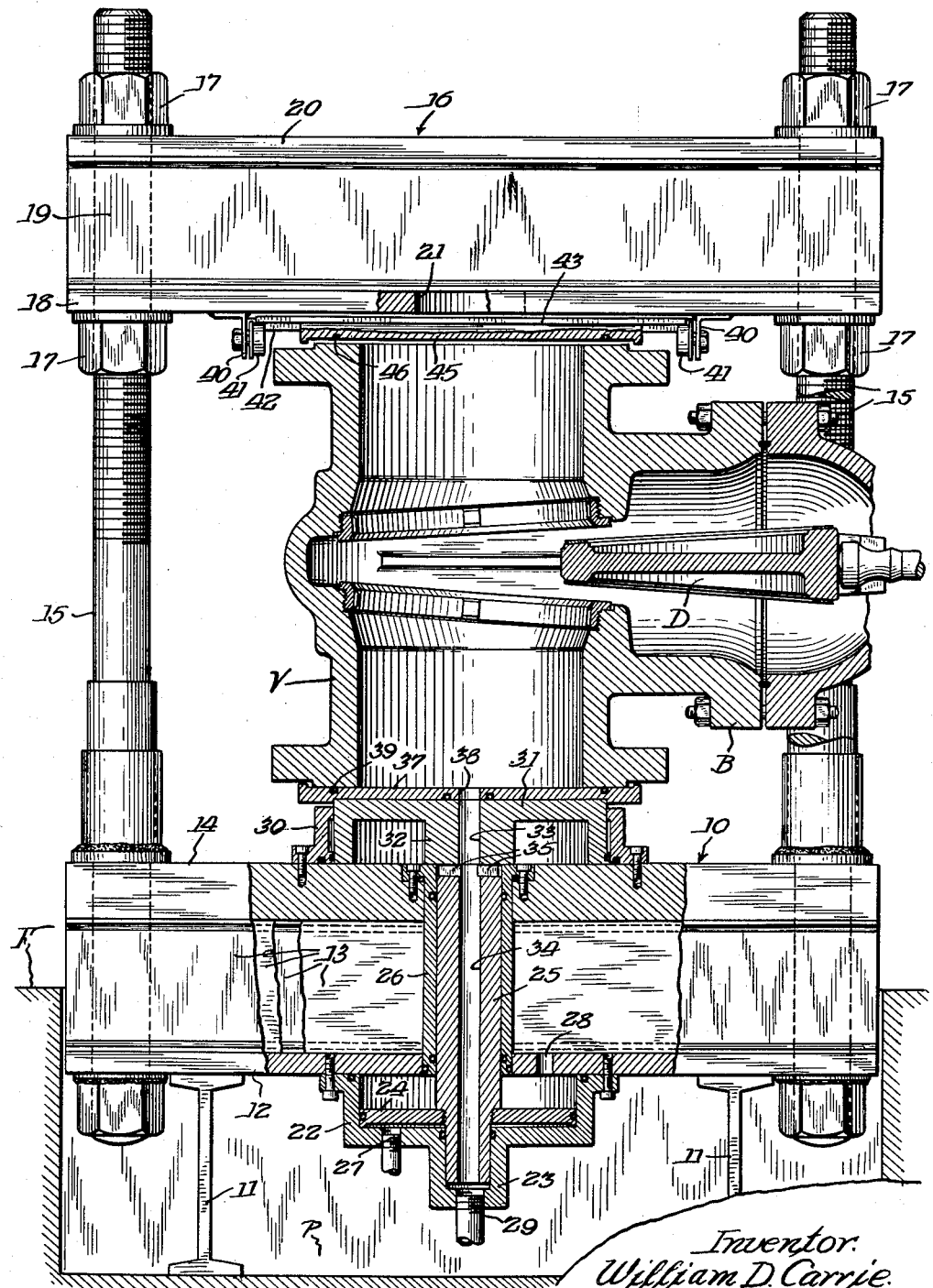
Inventor.
William D. Carrie.
By Joseph O. Lange
Atty.

United States Patent Office 2,934,943
Patented May 3, 1960

2,934,943

VALVE PRESSURE TESTING APPARATUS

William D. Carrie, Lisle, Ill., assignor to Crane Co., Chicago, Ill., a corporation of Illinois Application May 24, 1956, Serial No. 587,098

8 Claims. (Cl. 73—46)

The present invention relates to apparatus for the pressure testing of valves and like articles, and more particularly to such apparatus which maintains the valves closely sealed against loss of testing pressure and prevents distortion of the valves at high pressures.

In the testing of valves by internally applied fluid pressure, especially in the case of relatively large valves, there is a problem in properly sealing the valve against escape of the pressure fluid. Testing apparatus holding the valve sealingly clamped therein may be so deformed, for example elongated, by the fluid pressure that gapping and leakage at the valve end seals occurs, unless sufficiently great clamping pressure is applied to maintain the seals despite such elongation or other deformation. Such great pressure, again, often causes permanent distortion or deformation of the valve itself such as to make it defective in service. The clamping of end closure members directly to the valve under test, as by C-clamps, bolts, or the like, requires considerable time and labor, particularly with large valves, thus slowing the testing procedure and increasing its cost. Apparatus according to this invention avoids such difficulties while maintaining the valve tightly sealed without any possibility of damaging the valve. The illustrated embodiment, particularly adapted for large valves, employs cylinder means actuated by the testing fluid to maintain a valve sealingly clamped by a following up of relative valve movement, under relatively light pressure. This arrangement avoids any valve distortion, fluid-operated means being provided to operate the said cylinder means independently of the testing fluid for initially clamping the valve in testing position prior to introduction of the testing fluid. The apparatus is capable of accommodating valves of a considerable range of sizes, for example, from twelve to twenty-four inches in diameter or pipe size, and is also applicable to valves of many different types.

It is accordingly an object of the present invention to provide means for pressure testing of valves and like articles which effectively seals against escape of testing pressure without applying sealing pressure sufficient to distort the valve.

Another object is the provision of apparatus for pressure testing valves applying a follow-up sealing pressure to maintain the valves sealed against any tendency to open under the testing pressure.

Another object is the provision of valve pressure testing apparatus accommodating a wide range of sizes and types of valves.

Another object is the provision of valve pressure testing apparatus in which the pressure of testing fluid is utilized to maintain a valve sealed against escape of the fluid.

Other and further objects, advantages, and features of the invention will be apparent to those skilled in the art from the following description, taken with the accompanying drawing, in which:

The single figure is a front elevational view, partly in section and with certain parts broken away for clearness, of apparatus incorporating the invention.

Referring to the drawing, there is shown one apparatus embodying the invention, comprising a base 10 including a pair of I-beams 11 arranged in parallel relation and supporting a bottom plate 12 on which are secured two pairs of channel members 13 extending transversely of the I-beams. A base plate 14 extends over the channel members, and four posts 15 suitably secured to the base project from the plate 14. The upper portions of the posts are threaded, and a top member 16 is vertically adjustable thereon by means of the adjusting nuts 17. The top member comprises a plate 18 suitably apertured to receive the posts 15 therethrough and two pairs of channel members 19 similar to the members 13 of the base. A tie plate 20 overlies each pair of channel members 19. A viewing aperture 21 is formed centrally of the plate 18 between the pairs of channels. The base 10 is preferably at least partially disclosed in a pit P to bring the base plate 14 close to the floor F for greater facility in movement of valves into and out of the apparatus.

On the lower face of the bottom plate 12 is mounted a cylinder 22 which has an offset reduced central portion 23. A piston 24 is reciprocable in the main portion of the cylinder 22 and carries a piston rod 25 which extends out of the cylinder through the plates 12 and 14, a guide or bushing 26 which extends through the plates being provided for the piston rod. The piston rod also extends in the opposite direction into the reduced portion 23 of the cylinder. Appropriate means are provided to seal between the rod and the bushing 26 and the reduced portion 23. The cylinder 22 has a suitable connection as at 27 with a conduit leading from a source of fluid under pressure such as air, which may be any conventional means and accordingly is not shown. A vent 28 for the cylinder 22 is provided in the plate 12 to provide for unimpeded movement of the piston 24 under the pressure of the operating fluid. The reduced cylinder portion 23 has a connection as at 29 to suitable conduit means leading from a source of testing fluid under pressure, not shown. Suitable valve means are provided for controlling the introduction and withdrawal of the respective fluids through the connections 27 and 29.

A housing 30 for a floating cylinder 31 is mounted on the base plate 14 in axial alignment with the cylinder 22 and piston rod 25. The floating cylinder 31 has a central abutment 32 on the inner face of its end wall which engages the end of the piston rod 25. In the present case, the piston rod is shown having its free end substantially flush with the upper face of the base plate 14 when in its retracted position, the abutment 32 being of the full axial extent of the cylinder 31, but it will be clear that the lengths of the piston rod and the abutment 32 might vary, so long as these parts substantially engage in their retracted position. A fluid passage 33 is formed through the abutment 32 to provide communication between the interior and exterior of the cylinder 31, and in communication with a longitudinal fluid passage 34 extending through the piston rod 25, so that testing fluid introduced through the connection 29 may pass through the rod 25 and the cylinder passage 33. Lateral or radial passages 35 in the rod 25 extend from the passage 34 at such a point as to be substantially flush with the upper face of the base plate 14 in retracted position of the piston rod, so that upon projection of the rod communication is afforded between the passage 34 and the interior of the housing 30 and of the cylinder 31. In the present instance, the passages 35 are provided by forming a slot in the end of the piston rod. It will be apparent that these passages 35 may be provided at the corresponding point in the cylinder abutment 32, if it be extended into the bushing 26.

The floating cylinder normally projects slightly out of the housing 30, and an adapter plate 37 having a central aperture 38 for communication with the passage 33 is disposed on the outer face of the floating cylinder end wall. The face of the plate 37 adjacent the cylinder is preferably recessed so as to seat snugly thereon. The other face of the adapter plate is also formed with a recess or depression in which one end of a valve V to be tested is received, the plate having a groove for the reception of an O-ring 39, or having other suitable sealing means, to seal between the end of the valve and the adapter plate. The end wall of cylinder 31 thus acts as a platform for supporting the valve. The area defined by the sealing ring 39 is slightly less than the effective area of the floating cylinder 31. It will be apparent that when testing fluid is admitted through the piston rod 25 to the interior of the housing and floating cylinder, it will also be admitted through the passage 33 and the aperture 38 to the interior of the valve, and that due to the difference in the area of the floating cylinder and that defined by the seal ring 39, the cylinder 31 will be urged toward the valve so as to maintain a tight seal between the valve and adapter plate 37.

The valve V is shown as a gate valve with a bonnet B in which its wedge-type closure disk D is retracted in open position. The valve preferably is positioned with the bonnet at the rear of the apparatus for facilitating insertion and removal of the valve, but for clearness is illustrated as rotated some 90° out of such position.

Secured to the lower face of the plate 18 is a roller frame comprising a pair of parallel angle members 40, one on each side of the viewing aperture 21, each of which carries a plurality of rollers 41. The angle members preferably project rearwardly of the plate 18 for a considerable distance, and may have at the rear end a transverse stop bar 42. A carrier plate 43 is arranged to move below the plate 18 forwardly and rearwardly on the rollers 42, and an adapter plate 45 similar to the plate 37, but with no aperture therein, is secured in any suitable manner, as by screws, to the lower face of the carrier plate 43. The lower face of the plate 45 has a recess or depression to receive the other end of the valve V, and has an O-ring 46 to seal between the plate 45 and the valve.

Obviously, other cylinder means or other expansible and contractible fluid-operable means than the cylinder 31 in the housing 30 may be employed for the follow-up clamping of the valve, with substantially the same differential pressure arrangement. Similarly, other expansible or extensible or projectable means, fluid-operated or otherwise, may be substituted for the cylinder, piston, and piston rod construction shown for initially projecting the floating cylinder to clamp the valve in testing position. It will also be evident that the testing fluid need not be introduced into the valve through the floating cylinder, so long as the supply of testing fluid is common to the valve and the floating cylinder and housing, or even merely if the fluid supplied to the valve and to the cylinder is under substantially the same pressure. Clearly, however, it is very advantageous to employ the arrangement illustrated.

In operation, the top member 16 is adjusted on the posts 15 to a height such that the upper adapter plate 45 will clear the upper end of the valve to be tested, and the carrier plate with the adapter plate 45 secured thereto is brought into position opposite the plate 37 by means of the rollers 41. Then, with the piston rod 25 retracted, a valve V with the closure disk D in open position is disposed on the adapter plate 37. Air or other fluid is admitted into the cylinder 22 to act on the piston 24 and project the piston rod 25 outwardly of the cylinder 22 and inwardly of the housing 30, the floating cylinder 31 through its engagement with the piston rod being thus projected outwardly of the housing to move the valve V on the adapter plate 37 in the direction of the plate 18, moving the adapter plate 45 and the carrier plate 43 against the plate 18, so that the valve is sealingly clamped between the plates 37 and 45. Testing fluid is then admitted into the reduced cylinder portion 23, passing through the passages 34 and 35 into the interior of the housing and floating cylinder and through the passage 33 and aperture 38 of the cylinder and adapter plate 37, respectively, into the valve interior. As already pointed out, the pressure differential between the exterior and interior of the floating cylinder results in the floating cylinder being urged toward the plate 18, so that effective sealing is maintained between the valve and the adapter plates regardless of the testing pressure. The operating fluid may be exhausted from the cylinder 22, allowing the piston 24 and piston rod 25 to return to normal or retracted position, the floating cylinder 31 under the action of the testing fluid maintaining the valve in the sealingly clamped relation. If desired, a connection to the operating fluid source may be employed in place of the vent 28 to provide for positive pressure in retracting the piston rod, but this is not normally required because of the weight of the valve. With the closure disk D of the valve in open position, the application of the testing fluid for a suitable length of time to the interior of the valve, with proper visual inspection of the exterior, will indicate any flaws or leaks in the valve body.

In order to test for possible seat leakage, the valve with the disk D closed is disposed on the plate 37, and the carrier plate 43 is rolled onto the rearwardly projecting portion of the roller frame so as to leave unobstructed the portion of the plate 18 opposed to the adapter plate 37, in which portion the viewing aperture 21 is formed. The piston rod 25 is then projected in the manner already explained, so that the end of the valve opposite that received in the adapter plate 37 is brought into engagement with the plate 18, the interior portion of the valve above the disk D thus being open to inspection through the aperture 21. Testing fluid is then introduced through the connection 29, filling the lower portion of the valve and pressing the floating cylinder 21 and the adapter plate 37 against the valve due to the pressure differential as already explained, whereupon the piston rod 25 is preferably retracted. Leakage past the lower seat may then be detected by visual observation through the aperture 21. The testing fluid may be withdrawn through the connection 29, and the valve rotated end for end to repeat the seat leakage test for the other seat, in the case of a gate valve such as shown. Similar procedure is employed in seat leakage tests with other types of valves, being varied as appropriate to the particular seat arrangement encountered.

It will be apparent that the adapter plates 37 and 45 will accommodate smaller sizes of valves than that shown which have flat end surfaces to overlie the O-rings 39 and 46. Similar adapter plates with smaller diameter O-rings or other suitable sealing means are employed for still smaller valves, each plate accommodating a range of valve sizes. For valves having other types of end formations, the adapter plates may be correspondingly formed for receiving the valve ends in sealed relation. The several adapter plates are made interchangeable as far as application to the floating cylinder 31 or carrier plate 43 is concerned. The floating cylinder is preferably dimensioned to accommodate the largest size of valve made in regular production, but the apparatus frame is sufficiently large to receive larger valves which may be produced to meet special size requirements. In such case, the housing 30 and floating cylinder 31 may be replaced by corresponding parts of sufficiently larger diameter to accommodate the large valves and provide for the pressure differential as explained above.

I claim:

1. Apparatus for pressure testing valves and the like comprising a support, a cylinder fixed on said support, a housing fixed on the support axially aligned with said cylinder, a piston working in the cylinder, a piston rod on said piston projectable outwardly of the cylinder and inwardly of the housing having a longitudinal fluid passage therethrough, means for introducing operating fluid under pressure to the cylinder for moving the piston to project said piston rod, a floating cylinder reciprocable in the housing engageable by the piston rod for projection thereof outwardly of the housing upon projection of the rod, passage means through the end wall of the floating cylinder providing communication between the interior and exterior thereof, lateral passage means in the piston rod opening said fluid passage to the interior of the housing and floating cylinder upon projection of the rod, a member on the floating cylinder for receiving an end of a valve to be tested having an aperture communicating with said end wall passage means and also having means sealing about such valve end defining an area subject to fluid pressure in such valve smaller than the effective area of the floating cylinder, means for introducing testing fluid under pressure into said piston rod passage, and means on the support in spaced opposed relation to said receiving member for engaging a portion of such valve opposed to said end for clamping of such valve between said engaging means and the receiving member.

2. Apparatus for pressure testing valves and the like, comprising a support, a housing on the support, fluid-operable cylinder means on the support axially projectable inwardly of said housing, means for supplying operating fluid under pressure to said cylinder means for projection thereof, a floating cylinder reciprocable in the housing engageable for projection outwardly thereof by the cylinder means upon projection thereof, means on said floating cylinder for receiving one end of a valve to be tested having means sealing about such valve end defining an area subject to fluid pressure in such valve smaller than the effective area of the floating cylinder, means for introducing testing fluid under substantially the same pressure into such valve and the cylinder means, and means on the support in opposed spaced relation to said receiving means for engaging a portion of such valve opposed to said one end thereof.

3. Apparatus for pressure testing valves and the like, comprising a support, fluid-operable expansible and contractible means on the support including platform means movable therewith, means on said platform means for receiving one end of a valve to be tested having means sealing about such valve end defining an area subject to fluid pressure in such valve smaller than the effective pressure area of the expansible and contractible means, means for introducing testing fluid into such valve and the expansible and contractible means, pressure fluid means operable for expanding said expansible and contractible means independently of said testing fluid, and means in spaced opposed relation to said receiving means for engaging a portion of such valve opposed to said one end thereof.

4. Apparatus for pressure testing valves and the like, comprising a support, fluid-operable extensible and contractible means on said support including platform means movable therewith, means on said platform means for receiving one end of a valve having means for sealing about said valve end defining an area subject to fluid pressure in such valve smaller than the effective pressure area of said extensible and contractible means, means on the support in opposed relation to the receiving means for engaging a portion of such valve opposed to said one end thereof, pressure fluid means cooperable with said extensible and contractible means for extension thereof toward said engaging means to clamp such valve between the receiving means and engaging means, and means for introducing testing fluid under substantially common pressure into such valve and the extensible and contractible means upon said clamping movement.

5. Apparatus for pressure testing valves and the like, comprising a support, a cylinder fixed on said support, a housing fixed on the support in axial alignment with said cylinder, a piston working in the cylinder, a piston rod on said piston projectable outwardly of the cylinder and inwardly of said housing and having a longitudinal fluid passage therethrough, means supplying operating fluid under pressure to the cylinder for moving the piston to project said piston rod, means supplying testing fluid under pressure to said piston rod passage, lateral passage means providing communication between the piston rod passage and the housing upon piston rod projection, a floating cylinder reciprocable in the housing projectable outwardly thereof and engaging with the piston rod for projecting movement thereby, passage means through the end wall of the floating cylinder communicating with the piston rod passage, a member on the floating cylinder for receiving one end of a valve to be tested having an aperture providing communication between the valve interior and said floating cylinder passage means and also having means sealing about the end of such valve defining an area subject to fluid pressure in the valve slightly smaller than the effective area of the floating cylinder, and a closure member movable on said support into spaced opposed relation to said receiving member for sealingly closing the other end of such valve upon projecting movement of the floating cylinder to clamp such valve therebetween.

6. Apparatus for pressure testing valves and the like, comprising a support, fluid-operable cylinder means on the support including platform means movable therewith, means on said platform means for receiving one open end of a valve to be tested having means sealing about such valve end defining an area subject to fluid pressure in such valve smaller than the effective area of the cylinder means, closure means in spaced opposed relation to said receiving means for sealingly closing the other end of such valve, fluid-operable extensible means for extending said cylinder means to clamp such valve between the receiving means and closing means, and means for introducing testing fluid into such valve and the cylinder means under substantially common pressure upon said clamping of such valve 7. Apparatus for pressure testing valves and the like, comprising a support, fluid-operable extensible and contractible means on said support including platform means movable therewith, means on said platform means for receiving one end of a valve to be tested having means sealing about said one end defining an area subject to fluid pressure in such valve smaller than the effective pressure area of the expansible and contractible means, closure means in spaced opposed relation to said receiving means for sealingly closing the other end of such valve, fluid-actuated means operable to extend the extensible and contractible means for clamping such valve between the closure means and receiving means, and means operable upon said clamping to introduce testing fluid into such valve and the extensible and contractible means under substantially the same pressure.

8. Apparatus for pressure testing valves and the like, comprising a support, a cylinder fixed on said support, a housing on the support axially aligned with said cylinder, a piston working in the cylinder, a piston rod on said piston projectable outwardly of the cylinder and inwardly of the housing having a longitudinal fluid passage therethrough, a floating cylinder reciprocable in the housing and projectable outwardly thereof by said projectable piston rod, passage means through the end wall of the floating cylinder providing communication between the interior and exterior thereof, lateral passage means in the piston rod opening said longitudinal passage to the housing and floating cylinder upon projection of the rod, a member on said end wall for receiving an end of a valve to be tested having an aperture communicating with said end wall passage means and also having means sealing about such valve end defining an area subject to fluid pressure in such valve smaller than the effective area of the floating cylinder, means on the support in spaced opposed relation to said receiving means for engaging the other end of such valve, a viewing aperture defined in said engaging means located for substantial alignment with such valve, means for introducing operating fluid under pressure into the fixed cylinder for moving the piston to project the piston rod and the floating cylinder for clamping such valve between the receiving means and engaging means, and means for introducing testing fluid under pressure into said piston rod longitudinal passage upon said clamping of such valve to enter such valve and said housing and floating cylinder.

References Cited in the file of this patent

UNITED STATES PATENTS

| | | |
|---|---|---|
| 1,467,813 | Rahm | Sept. 11, 1923 |
| 1,973,674 | Rosenkranz | Sept. 11, 1934 |
| 2,231,807 | Hybarger | Feb. 11, 1941 |
| 2,426,406 | Meyers | Aug. 26, 1947 |